US012228206B1

(12) United States Patent
Runde et al.

(10) Patent No.: US 12,228,206 B1
(45) Date of Patent: Feb. 18, 2025

(54) CONTROL SYSTEMS TO DAMPEN OUTPUT SHAFT OSCILLATIONS, VEHICLES AND TRANSMISSIONS INCORPORATING THE SAME, AND METHODS THEREFOR

(71) Applicant: ALLISON TRANSMISSION, INC., Indianapolis, IN (US)

(72) Inventors: Jeff Runde, Fishers, IN (US); Doug Hansel, Indianapolis, IN (US); Tyler Swedes, Indianapolis, IN (US)

(73) Assignee: Allison Transmission, Inc., Indianapolis, IN (US)

( * ) Notice: Subject to any disclaimer, the term of this patent is extended or adjusted under 35 U.S.C. 154(b) by 0 days.

(21) Appl. No.: 18/587,168

(22) Filed: Feb. 26, 2024

(51) Int. Cl.
*F16H 61/06* (2006.01)
*F16H 59/40* (2006.01)
*F16H 63/30* (2006.01)
*F16H 57/00* (2012.01)

(52) U.S. Cl.
CPC .......... *F16H 61/061* (2013.01); *F16H 59/40* (2013.01); *F16H 63/3026* (2013.01); *F16H 2057/0012* (2013.01)

(58) Field of Classification Search
CPC .......... F16H 2057/0012; F16H 61/061; F16H 59/40; F16H 63/3026; F16H 57/0006; F16H 2061/0078; F16D 2300/22; F16D 2500/50293; F16D 2500/10412; F16D 2500/30415; F16D 2500/3024; F16D 2500/30825; F16D 2500/70406; F16D 2500/70484; F16D 2500/7061–70636; B60W 2510/104; B60W 2710/025; B60W 2710/1038; B60W 2030/203
See application file for complete search history.

(56) References Cited

U.S. PATENT DOCUMENTS

| | | | |
|---|---|---|---|
| 4,527,678 A * | 7/1985 | Pierce | F16H 61/061 477/154 |
| 5,350,989 A | 9/1994 | Wedeen | |
| 6,574,535 B1 * | 6/2003 | Morris | B60K 6/44 180/65.6 |
| 6,626,031 B2 | 9/2003 | Reuschel | |
| 7,121,160 B2 | 10/2006 | Gogins | |
| 7,577,510 B2 | 8/2009 | Fodor et al. | |
| 8,510,003 B2 | 8/2013 | Yanakiev et al. | |
| 9,206,898 B2 | 12/2015 | Mordukhovich et al. | |
| 9,506,509 B1 * | 11/2016 | Fowler | F16D 48/06 |

(Continued)

FOREIGN PATENT DOCUMENTS

AU 2017224287 B2 8/2017

*Primary Examiner* — Timothy Hannon
(74) *Attorney, Agent, or Firm* — Taft Stettinius & Hollister LLP; Stephen F. Rost

(57) ABSTRACT

Vehicles, transmissions, and methods of dampening oscillations at an output shaft of a transmission are disclosed. A vehicle includes a chassis, a plurality of wheels coupled to the chassis, and a powertrain mounted to the chassis that includes a transmission. The transmission includes an input shaft to receive torque from a drive unit, an output shaft to transmit torque to a load, at least one torque-transmitting mechanism coupled between the input shaft and the output shaft, and a control system having an output speed sensor to provide an input signal indicative of a rotational speed of the output shaft and a controller communicatively coupled to the output speed sensor.

20 Claims, 11 Drawing Sheets

(56) References Cited

U.S. PATENT DOCUMENTS

| | | | |
|---|---|---|---|
| 9,815,473 B2 | 11/2017 | Fujii et al. | |
| 10,180,186 B2 * | 1/2019 | Pietron | F16H 3/66 |
| 2009/0090592 A1 | 4/2009 | Mordukhovich et al. | |
| 2011/0307150 A1 * | 12/2011 | Jiang | F16H 61/688 |
| | | | 477/77 |
| 2015/0024905 A1 * | 1/2015 | Dunfee, II | B60W 10/02 |
| | | | 477/77 |
| 2015/0251649 A1 * | 9/2015 | Liang | B60W 10/08 |
| | | | 903/903 |
| 2017/0108061 A1 | 4/2017 | Neuberth et al. | |
| 2018/0202543 A1 * | 7/2018 | Srinivasan | B60W 10/115 |

* cited by examiner

CONTROL SYSTEMS TO DAMPEN OUTPUT SHAFT OSCILLATIONS, VEHICLES AND TRANSMISSIONS INCORPORATING THE SAME, AND METHODS THEREFOR

FIELD OF THE DISCLOSURE

The present disclosure relates, generally, to control systems for transmissions, and, more specifically, to transmission control systems incorporating a sensor to measure rotational speed of a transmission output shaft.

BACKGROUND

In some configurations, fluctuations in torque output by a transmission output shaft may cause the output shaft to oscillate. Such oscillations may be detected by a vehicle operator as shudder occurring during operation of the vehicle. Systems, devices, and/or methods for reducing shudder that avoid drawbacks associated with previous configurations remain an area of interest.

SUMMARY

The present disclosure may comprise one or more of the following features and combinations thereof.

According to one aspect of the present disclosure, a vehicle may include a chassis, a plurality of wheels coupled to the chassis, and a powertrain mounted to the chassis. The powertrain may include a transmission. The transmission may include an input shaft to receive torque from a drive unit, an output shaft to transmit torque to a load, at least one torque-transmitting mechanism coupled between the input shaft and the output shaft, and a control system. The control system may include an output speed sensor to provide an input signal indicative of a rotational speed of the output shaft and a controller communicatively coupled to the output speed sensor. The controller may include a processor and memory having instructions stored therein. The instructions may be executable by the processor to cause the processor to monitor the rotational speed of the output shaft based on the input signal, to determine a difference between the monitored rotational speed and a reference rotational speed of the output shaft, to determine an adjustment to an oncoming clutch pressure to be applied to the at least one torque-transmitting mechanism based on the difference, to determine a compensated clutch pressure to be applied to the at least one torque-transmitting mechanism based on the adjustment, and to apply the compensated clutch pressure to the at least one torque-transmitting mechanism to dampen oscillations at the output shaft in use of the vehicle.

In some embodiments, the vehicle may be devoid of a mechanical damper coupled to the output shaft. The instructions may be executable by the processor to cause the processor to apply the compensated clutch pressure to the at least one torque-transmitting mechanism to dampen oscillations at the output shaft during a transition from one operating mode of the transmission to another operating mode of the transmission.

In some embodiments, to determine the difference between the monitored rotational speed and the reference rotational speed of the output shaft, the instructions may be executable by the processor to cause the processor to receive the input signal from the output speed sensor, to retrieve the reference rotational speed of the output shaft, to compare the input signal to the reference rotational speed, and to determine the difference based on the comparison. To determine the adjustment to the oncoming clutch pressure, the instructions may be executable by the processor to cause the processor to calculate the adjustment based on the difference between the monitored rotational speed and the reference rotational speed of the output shaft and to convert the calculated adjustment to a desired clutch pressure command. To determine the compensated clutch pressure, the instructions may be executable by the processor to cause the processor to receive a base oncoming clutch pressure command, to receive the desired clutch pressure command, and to determine the compensated clutch pressure based on the base oncoming clutch pressure command and the desired clutch pressure command.

In some embodiments, to monitor the rotational speed of the output shaft, the instructions may be executable by the processor to cause the processor to monitor the rotational speed of the output shaft in response to an initial detection by the output speed sensor of a rotational target disposed in proximity to the output shaft. The rotational target may be any one of a plurality of teeth formed on the output shaft. Additionally, in some embodiments, initial detection by the output speed sensor of the rotational target may offset lag in hydraulic actuation of the at least one torque-transmitting mechanism.

According to another aspect of the present disclosure, a transmission may include an input shaft to receive torque from a drive unit, an output shaft to transmit torque to a load, at least one torque-transmitting mechanism coupled between the input shaft and the output shaft, and a control system. The control system may include an output speed sensor to provide an input signal indicative of a rotational speed of the output shaft and a controller communicatively coupled to the output speed sensor. The controller may include a processor and memory having instructions stored therein. The instructions may be executable by the processor to cause the processor to monitor the rotational speed of the output shaft based on the input signal, to determine a difference between the monitored rotational speed and a reference rotational speed of the output shaft, and to determine an adjustment to an oncoming clutch pressure to be applied to the at least one torque-transmitting mechanism based on the difference. The transmission may be devoid of a mechanical damper coupled to the output shaft.

In some embodiments, to determine the adjustment to the oncoming clutch pressure, the instructions may be executable by the processor to cause the processor to calculate the adjustment based on the difference between the monitored rotational speed and the reference rotational speed of the output shaft and to convert the calculated adjustment to a desired clutch pressure command. Additionally, in some embodiments, to determine the difference between the monitored rotational speed and the reference rotational speed of the output shaft, the instructions may be executable by the processor to cause the processor to receive the input signal from the output speed sensor, to retrieve the reference rotational speed of the output shaft, to compare the input signal to the reference rotational speed, and to determine the difference based on the comparison.

In some embodiments, to monitor the rotational speed of the output shaft, the instructions may be executable by the processor to cause the processor to monitor the rotational speed of the output shaft in response to an initial detection by the output speed sensor of any one of a plurality of teeth disposed in proximity to the output shaft. Initial detection by the output speed sensor of the any one of the plurality of teeth may offset lag in hydraulic actuation of the at least one torque-transmitting mechanism.

In some embodiments, the instructions may be executable by the processor to cause the processor to determine a compensated clutch pressure to be applied to the at least one torque-transmitting mechanism based on the adjustment. The instructions may be executable by the processor to cause the processor to apply the compensated clutch pressure to the at least one torque-transmitting mechanism to dampen oscillations at the output shaft in use of the transmission.

According to yet another aspect of the present disclosure, a method of dampening oscillations at an output shaft of a transmission may include: monitoring, by a controller, a rotational speed of the output shaft based on an input signal provided by an output speed sensor; determining, by the controller, a difference between the monitored rotational speed and a reference rotational speed of the output shaft; determining, by the controller, an adjustment to an oncoming clutch pressure to be applied to at least one torque-transmitting mechanism of the transmission based on the difference; determining, by the controller, a compensated clutch pressure to be applied to the at least one torque-transmitting mechanism based on the adjustment; and applying, by the controller, the compensated clutch pressure to the at least one torque-transmitting mechanism to dampen oscillations at the output shaft in use of the transmission.

In some embodiments, applying the compensated clutch pressure to the at least one torque-transmitting mechanism may include dampening oscillations at the output shaft without using a mechanical damper coupled to the output shaft. Additionally, in some embodiments, monitoring the rotational speed of the output shaft may include monitoring the rotational speed of the output shaft in response to an initial detection by the output speed sensor of any one of a plurality of teeth disposed in proximity to the output shaft. Initial detection by the output speed sensor of the any one of the plurality of teeth may offset lag in hydraulic actuation of the at least one torque-transmitting mechanism.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
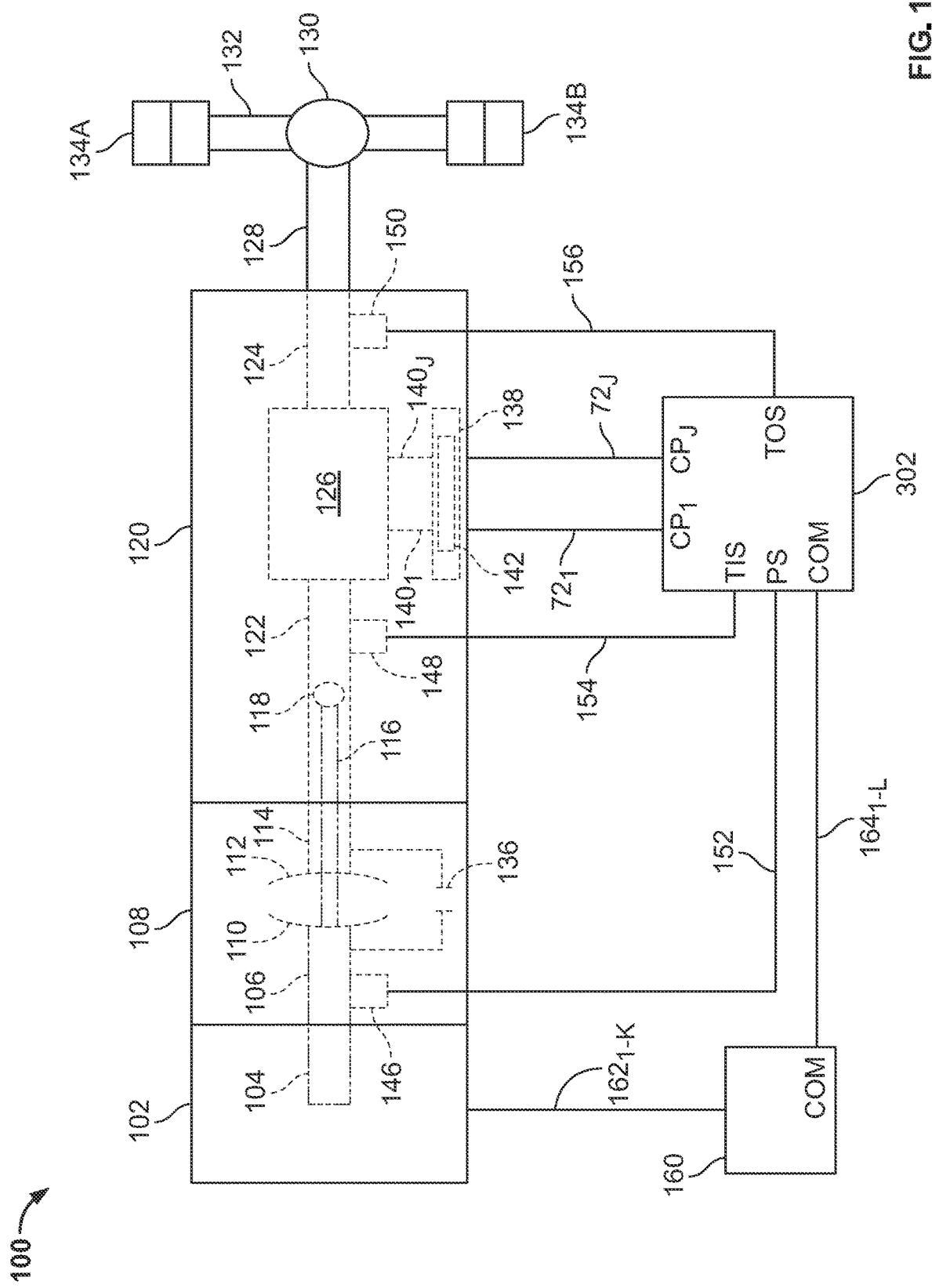
FIG. 1 is a partial diagrammatic depiction of a drive system for a vehicle.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features, such as those representing devices, modules, instructions blocks and data elements, may be shown in specific arrangements and/or orderings for ease of description. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

In some embodiments, schematic elements used to represent blocks of a method may be manually performed by a user. In other embodiments, implementation of those schematic elements may be automated using any suitable form of machine-readable instruction, such as software or firmware applications, programs, functions, modules, routines, processes, procedures, plug-ins, applets, widgets, code fragments and/or others, for example, and each such instruction may be implemented using any suitable programming language, library, application programming interface (API), and/or other software development tools. For instance, in some embodiments, the schematic elements may be implemented using Java, C++, and/or other programming languages. Similarly, schematic elements used to represent data or information may be implemented using any suitable electronic arrangement or structure, such as a register, data store, table, record, array, index, hash, map, tree, list, graph, file (of any file type), folder, directory, database, and/or others, for example.

Further, in the drawings, where connecting elements, such as solid or dashed lines or arrows, are used to illustrate a connection, relationship, or association between or among two or more other schematic elements, the absence of any such connection elements is not meant to imply that no connection, relationship, or association can exist. In other words, some connections, relationships, or associations between elements may not be shown in the drawings so as not to obscure the disclosure. In addition, for ease of illustration, a single connecting element may be used to represent multiple connections, relationships, or associations between elements. For example, where a connecting element represents a communication of signals, data or instructions, it should be understood by those skilled in the art that such element may represent one or multiple signal paths (e.g., a bus), as may be needed, to effect the communication.

In some vehicle configurations, rotational power may be transmitted from an output shaft of a transmission to a driveline of the vehicle that lacks one or more structures (e.g., mechanical dampers, shock absorbers, struts, suspension devices, or the like) to dampen oscillations resulting from torque output fluctuations at the output shaft. Additionally, in some vehicle configurations, rotational power may be transmitted from a transmission output shaft to a vehicle driveline that is underdamped such that oscillations are experienced by the vehicle driveline despite the provision of one or more dampening devices. In either case, for the purposes of the present disclosure, vehicle drivelines subject to oscillations due to transmission output shaft torque fluctuations may be referred to as flexible drivelines.

Oscillations transmitted to flexible drivelines may be detected by vehicle operators as shudder. Shudder may be particularly evident to vehicle operators during a shift or transition from one operating mode of the transmission to another operating mode thereof. For example, in some configurations, shudder may be commonly detected during a shift or transition from a first forward range or gear ratio of the transmission to a second forward range or gear ratio of the transmission. Of course, it should be appreciated that the observability of shudder effects may vary depending on the particular vehicle and the particular ranges or gear ratios of the vehicle transmission. Regardless, in many cases, shudder may be detrimental to ride quality, shift time, and/or shift quality.

The present disclosure envisions systems, devices, and/or methods for dampening oscillations at an output shaft of a transmission to reduce shudder and thereby improve ride quality, shift time, and/or shift quality. In the illustrative embodiment, a vehicle (e.g., the vehicle 200 shown in FIG. 2) includes a chassis or main frame 202, wheels 204 coupled to the chassis 202, and a powertrain 210 mounted to the chassis 202. In the illustrative embodiment, the powertrain 210 is embodied as, or otherwise includes, a collection of devices that are cooperatively capable of generating and transmitting rotational power to the wheels 204 of the vehicle 200 to propel the vehicle 200 in use thereof. In some embodiments, the powertrain 210 is mounted to the chassis 202 transverse to a longitudinal axis LA along which the chassis 202 extends. In those embodiments, the powertrain 210 is arranged transverse to a travel direction TD of the vehicle 200, and the powertrain 210 may be said to have a transverse mounting arrangement relative to the chassis 202. In other embodiments, however, the powertrain 210 may be mounted to the chassis 202 in another suitable manner.

Figure 2:
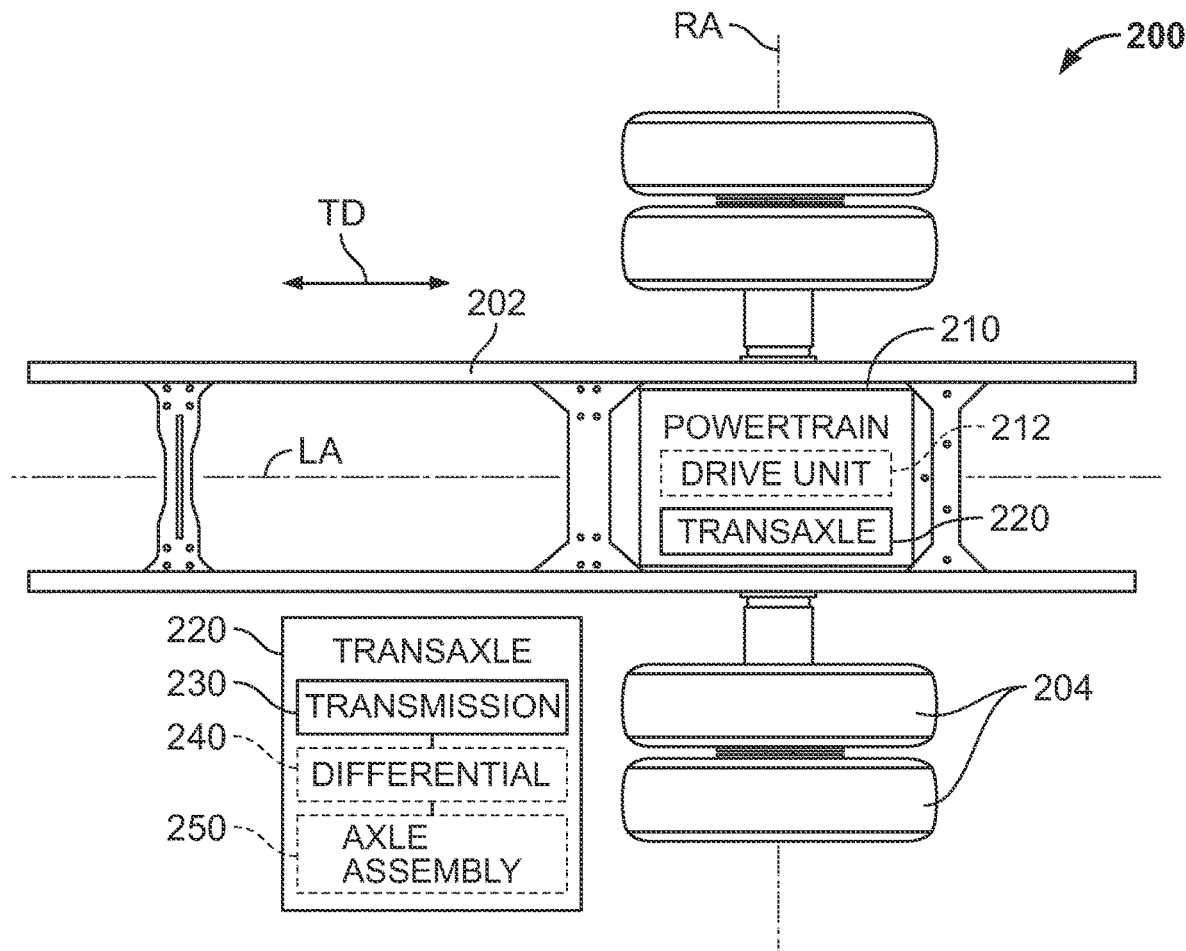
FIG. 2 is a partial diagrammatic depiction of a powertrain for a vehicle.

In any case, in the illustrative embodiment, the powertrain 210 includes a transmission, such as the transmission 230 shown in FIG. 2 and/or the transmission 120 shown in FIG. 1, for example. With reference to FIG. 1, the transmission 120 includes an input shaft 122 to receive torque from a drive unit (e.g., the drive unit 102), an output shaft 124 to transmit torque to a load (e.g., an axle 132 and wheels 134A, 134B mounted thereto), and at least one torque-transmitting mechanism 142 (shown in phantom) coupled between the input shaft 122 and the output shaft 124. Additionally, the transmission 120 and/or transmission 230 includes a control system 300 (see FIG. 3) having an output speed sensor 150 to provide an input signal indicative of a rotational speed of the output shaft 124 and a controller 302 communicatively coupled to the output speed sensor 150.

Figure 6:
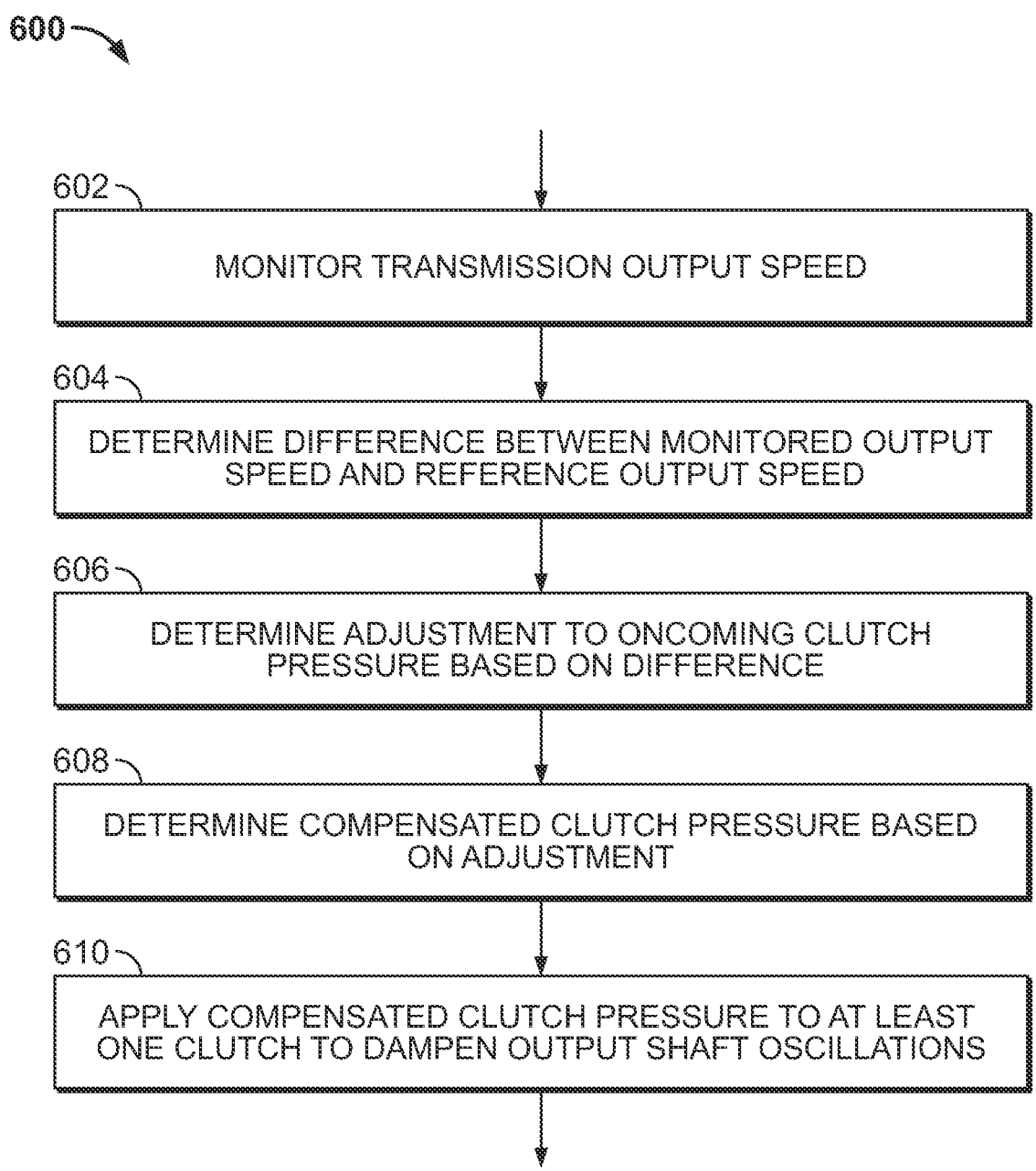
FIG. 6 is a simplified flowchart of a method of dampening oscillations at an output shaft of a transmission.

The illustrative controller 302 includes a processor 304 and memory 306 having instructions stored therein. In the illustrative embodiment, as best seen in FIG. 6, the instructions are executable by the processor 304 to cause the processor 304 to monitor the rotational speed of the output shaft 124 based on the input signal provided by the output speed sensor 150 (see block 602), to determine a difference between the monitored rotational speed and a reference rotational speed of the output shaft 124 (see block 604), to determine an adjustment to an oncoming clutch pressure to be applied to the at least one torque-transmitting mechanism 142 based on the difference (see block 606), to determine a compensated clutch pressure to be applied to the at least one torque-transmitting mechanism 142 based on the adjustment (see block 608), and to apply the compensated clutch pressure to the at least one torque-transmitting mechanism 142 to dampen oscillations at the output shaft 124 in use of the vehicle 200 (see block 610). As such, the illustrative control system 300 employs a computer-implemented model to dampen oscillations at the output shaft 124 without a damper device (e.g., a mechanical damper) coupled to the output shaft 124.

In some configurations, provision of a mechanical damper may suffice to dampen oscillations associated with shudder or other driveline disturbances distinct from shudder. In contrast, at least in some embodiments, the vehicle 200 is devoid of a mechanical damper coupled to the output shaft 124. The illustrative control system 300 is designed to dampen oscillations at the output shaft 124 associated with shudder or other driveline disturbances distinct from shudder in a manner similar to a mechanical damper.

Referring now to FIG. 1, an illustrative drive system 100 is adapted for use in one or more vehicles employed in a variety of applications. In some embodiments, the drive system 100 may be adapted for use with, or otherwise incorporated into, fire and emergency vehicles, refuse vehicles, coach vehicles, RVs and motorhomes, municipal and/or service vehicles, agricultural vehicles, mining vehicles, specialty vehicles, energy vehicles, defense vehicles, port service vehicles, construction vehicles, and transit and/or bus vehicles, just to name a few. Additionally, in some embodiments, the drive system 100 may be adapted for use with, or otherwise incorporated into, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, and marine engines, among other suitable equipment.

In the illustrative embodiment, the drive unit 102 is embodied as, or otherwise includes, any device capable of producing rotational power to drive other components (e.g., a torque converter 108 and the transmission 120) of the drive system 100 in use thereof. In some embodiments, the drive unit 102 may be embodied as, or otherwise include, an internal combustion engine, diesel engine, electric motor, or other power-generating device. In any case, the drive unit 102 is configured to rotatably drive an output shaft 104 that is coupled to an input or pump shaft 106 of a torque converter 108.

The input or pump shaft 106 of the illustrative torque converter 108 is coupled to an impeller or pump 110 that is rotatably driven by the output shaft 104 of the drive unit 102. The torque converter 108 further includes a turbine 112 that is coupled to a turbine shaft 114. In the illustrative embodiment, the turbine shaft 114 is coupled to, or integral with, the input shaft 122 of the transmission 120.

The illustrative torque converter 108 also includes a lockup clutch 136 connected between the pump 110 and the turbine 112 of the torque converter 108. The torque converter 108 is operable in a so-called "torque converter" mode during certain operating conditions, such as during vehicle launch, low speed conditions, and certain gear shifting conditions, for example. In the torque converter mode, the lockup clutch 136 is disengaged and the pump 110 rotates at the rotational speed of the drive unit output shaft 104 while the turbine 112 is rotatably actuated by the pump 110 through a fluid (not shown) interposed between the pump 110 and the turbine 112. In this operational mode, torque multiplication occurs through the fluid coupling such that the turbine shaft 114 is exposed to drive more torque than is being supplied by the drive unit 102. The torque converter 108 is alternatively operable in a so-called "lockup" mode during other operating conditions, such as when torque multiplication is not needed, for example. In the lockup mode, the lockup clutch 136 is engaged and the pump 110 is thereby secured directly to the turbine 112 so that the drive unit output shaft 104 is directly coupled to the input shaft 124 of the transmission 118.

In the illustrative embodiment, the transmission 120 includes an internal pump 118 configured to pressurize, and/or distribute fluid toward, one or more fluid (e.g., hydraulic fluid) circuits thereof. In some embodiments, the pump 118 may be configured to pressurize, and/or distribute fluid toward, a main circuit, a lube circuit, an electro-hydraulic control circuit, and/or any other circuit incorporated into the electro-hydraulic system 138, for example. It should be appreciated that in some embodiments, the pump 118 may be driven by a shaft 116 that is coupled to the output shaft 104 of the drive unit 102. In this arrangement, the drive unit 102 can deliver torque to the shaft 116 for driving the pump 118 and building pressure within the different circuits of the transmission 120.

The illustrative transmission 120 includes a gearing system 126 coupled between the input shaft 122 and the output shaft 124. It should be appreciated that the gearing system 126 may include one or more gear arrangements (e.g., planetary gear arrangements, epicyclic drive arrangements, etc.) that provide, or are otherwise associated with, one or more gear ratios. When used in combination with the electro-hydraulic system 138 under control by the control system 200, the gearing system 126 may provide, or otherwise be associated with, one or more operating ranges selected by an operator.

The output shaft 124 of the transmission 120 is illustratively coupled to, or otherwise integral with, a propeller shaft 128. The propeller shaft 128 is coupled to a universal joint 130 which is coupled to, and rotatably drives, the axle 132 and the wheels 134, 136. In this arrangement, the output shaft 124 drives the wheels 134, 136 through the propeller shaft 128, the universal joint 130, and the axle 132 in use of the drive system 100.

The illustrative transmission includes the electro-hydraulic system 138 that is fluidly coupled to the gearing system 126 via a number (i.e., J) of fluid paths 1401-140J, where J may be any positive integer. In the illustrative embodiment, the at least one torque-transmitting mechanism 142 may be included in the electro-hydraulic system 138. The electro-hydraulic system 138 is configured to receive control signals provided by various electro-hydraulic control devices 310 (see FIG. 3), such as one or more sensors 312 and one or more flow and/or pressure control devices 314, for example. In response to those control signals, and under control by the control system 300, the electro-hydraulic system 138 selectively causes fluid to flow through one or more of the fluid paths 1401-140J to control operation (e.g., engagement and disengagement) of one or more friction devices (e.g., the at least one torque-transmitting mechanism 142) included in, or otherwise adapted for use with, the gearing system 126.

Of course, it should be appreciated that the at least one torque-transmitting mechanism 142 may include, but is not limited to, one or more brake devices, one or more torque transmitting devices, and the like. Generally, the operation (e.g., engagement and disengagement) of the at least one torque-transmitting mechanism 142 is controlled by selectively controlling the friction applied by, or otherwise associated with, each of the one or more torque-transmitting mechanisms 142, such as by controlling fluid pressure applied to each of the mechanisms, for example. In the illustrative embodiment, which is not intended to be limiting in any way, the electro-hydraulic system 138 may be coupled to, or otherwise adapted for use with, one or more brakes 320. Similar to the torque-transmitting mechanism(s) 142, each of the one or more brakes 320 may be controllably engaged and disengaged via fluid pressure supplied by the electro-hydraulic system 138. In any case, changing or shifting between the various gears of the transmission 120 is accomplished by selectively controlling the friction devices 142, 320 via control of fluid pressure within the number of fluid paths 1401-140J.

In the illustrative system 100 shown in FIG. 1, the torque converter 108 and the transmission 120 include a number of sensors configured to produce sensor signals that are indicative of one or more operating states of the torque converter 108 and the transmission 120, respectively. For example, the torque converter 108 illustratively includes a speed sensor 146 that is configured to produce a speed signal corresponding to the rotational speed of the pump shaft 106, which rotates at the same speed as the output shaft 104 of the drive unit 102 in use of the drive system 100. The speed sensor 146 is electrically connected to a pump speed input (i.e., PS) of the controller 302 via a signal path 152, and the controller 302 is operable to process the speed signal produced by the speed sensor 146 to determine the rotational speed of the pump shaft 106/drive unit output shaft 104.

In the illustrative system 100, the transmission 120 includes a speed sensor 148 that is configured to produce a speed signal corresponding to the rotational speed of the transmission input shaft 122, which rotates at the same speed as the turbine shaft 114 of the torque converter 108 in use of the system 100. The input shaft 122 of the transmission 120 may be directly coupled to, or otherwise integral with, the turbine shaft 114. Of course, it should be appreciated that the speed sensor 148 may alternatively be configured to produce a speed signal corresponding to the rotational speed of the turbine shaft 114. Regardless, the speed sensor 148 is electrically connected to a transmission input shaft speed input (i.e., TIS) of the controller 302 via a signal path 154, and the controller 302 is operable to process the speed signal produced by the speed sensor 148 to determine the rotational speed of the turbine shaft 114/transmission input shaft 124.

Further, in the illustrative system 100, the transmission 120 includes the speed sensor 150 that is configured to produce a speed signal corresponding to the rotational speed and direction of the output shaft 124 of the transmission 120. The speed sensor 150 is electrically connected to a transmission output shaft speed input (i.e., TOS) of the controller 302 via a signal path 156. The controller 302 is configured to process the speed signal produced by the speed sensor 150 to determine the rotational speed of the transmission output shaft 124.

In the illustrative embodiment, the electro-hydraulic system 138 includes one or more actuators configured to control various operations within the transmission 120. For example, the electro-hydraulic system 138 described herein illustratively includes a number of actuators (e.g., which may be included in the devices 314) that are electrically connected to a number (i.e., J) of control outputs CP1-CPJ of the controller 302 via a corresponding number of signal paths 721-72J, where J may be any positive integer as described above. Each of the actuators may receive a corresponding one of the control signals CP1-CPJ produced by the controller 302 via one of the corresponding signal paths 721-72J. In response thereto, each of the actuators may control the friction applied by each of the friction devices by controlling the pressure of fluid within one or more corresponding fluid passageway 1401-140J, thereby controlling the operation of one or more corresponding friction devices based on information provided by the various speed sensors 146, 148, and/or 150 in use of the system 100.

In the illustrative embodiment, the system 100 includes a drive unit controller 160 having an input/output port (I/O) that is electrically coupled to the drive unit 102 via a number (i.e., K) of signal paths 162, wherein K may be any positive integer. The drive unit controller 160 is operable to control and manage the overall operation of the drive unit 102. The drive unit controller 160 includes a communication port (i.e., COM) which is electrically connected to a similar communication port (i.e., COM) of the controller 302 via a number (i.e., L) of signal paths 164, wherein L may be any positive integer. It should be appreciated that the one or more signal paths 164 may be referred to collectively as a data link. Generally, the drive unit controller 160 and the transmission controller 302 are operable to share information via the one or more signal paths 164. In one embodiment, for example, the drive unit controller 160 and the transmission controller 302 are operable to share information via the one or more signal paths 164 in the form of one or more messages in accordance with a Society of Automotive Engineers (SAE) J-1939 communications protocol. Of course, it should be appreciated that this disclosure contemplates other embodiments in which the drive unit controller 160 and the transmission controller 302 are operable to share information via the one or more signal paths 164 in accordance with one or more other communication protocols (e.g., from a conventional databus such as J1587 data bus, J1939 data bus, IESCAN data bus, GMLAN, Mercedes PT-CAN).

Referring now to FIG. 2, the powertrain 210 includes the drive unit 212 (shown in phantom) to generate rotational power and a transaxle 220 coupled to the drive unit 212 to receive rotational power therefrom and transmit rotational power to the wheels 204. The drive unit 212 may be identical or substantially identical to the drive unit 102, at least in some embodiments. In some embodiments, the vehicle 200 is embodied as, or otherwise includes, an electric vehicle. In one example, the vehicle 200 is embodied as, or otherwise includes, a medium or heavy-duty electric truck or electric bus, and the powertrain 210 is employed in lieu of one or more conventional powertrain(s) associated with one or more internal combustion engine configuration(s).

The illustrative transaxle 220 is embodied as, or otherwise include, any collection of devices capable of receiving rotational power from the drive unit 212 and transmitting rotational power to the wheels 204. In the illustrative embodiment, the transaxle 220 includes a transmission 230, a differential 240 (shown in phantom in FIG. 2) coupled to the transmission 230, and an axle assembly 250 (shown in phantom in FIG. 2) coupled to the differential 240. The transmission 230 may be identical or substantially identical to the transmission 120, at least in some embodiments.

Figure 3:
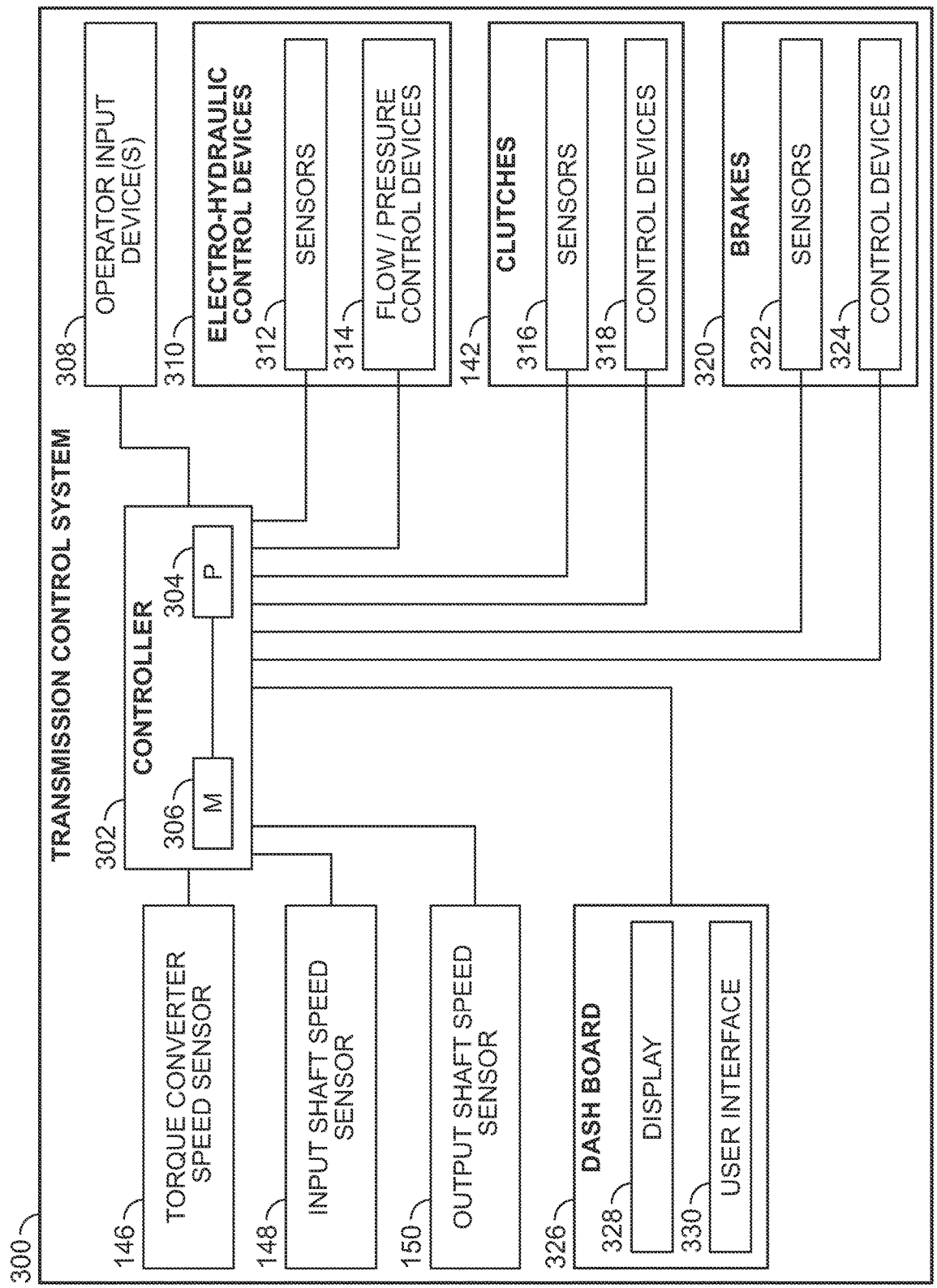
FIG. 3 is a diagrammatic view of a transmission control system included in a transmission of the drive system of FIG. 1 or the powertrain of FIG. 2.

Referring now to FIG. 3, in the illustrative embodiment, the transmission control system 300 includes the sensors 146, 148, 150, the controller 302, one or more operator input device(s) 308, one or more electro-hydraulic control devices 310, the at least one torque-transmitting mechanism 142, the brake(s) 320, and a dashboard 326. Each of the devices 146, 148, 150, 308, 310, 142, 320, 326 is communicatively coupled to the controller 302. In some embodiments, the controller 302 may be communicatively coupled to sensors 316 and/or control devices 318 of the at least one-torque transmitting mechanism 142 and to sensors 322 and/or control devices 324 of the brake(s) 320.

The processor 304 of the illustrative controller 302 may be embodied as, or otherwise include, any type of processor, controller, or other compute circuit capable of performing various tasks such as compute functions and/or controlling the functions of the transmissions 120, 230. For example, the processor 304 may be embodied as a single or multi-core processor(s), a microcontroller, or other processor or processing/controlling circuit. In some embodiments, the processor 304 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 304 may be embodied as, or otherwise include, a high-power processor, an accelerator co-processor, or a storage controller. In some embodiments still, the processor 304 may include more than one processor, controller, or compute circuit.

The memory device 306 of the illustrative controller 302 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Nonlimiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at www.jedec.org). Such standards (and similar standards) may be referred to as DDR-based standards and communication interfaces of the storage devices that implement such standards may be referred to as DDR-based interfaces.

In some embodiments, the memory device 306 may be embodied as a block addressable memory, such as those based on NAND or NOR technologies. The memory device 306 may also include future generation nonvolatile devices, such as a three dimensional crosspoint memory device (e.g., Intel 3D XPoint™ memory), or other byte addressable write-in-place nonvolatile memory devices. In some embodiments, the memory device 306 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

In some embodiments, the operator input device(s) 308 are configured to provide input indicative of one or more operational characteristics of the transmission 120, 230 and/or the vehicle 200 associated with the transmission 120, 230. In one example, the device(s) 308 may provide input generated by an operator of the vehicle 200 associated with the transmission 120, 230 (e.g., input to apply the compensated clutch pressure to the at least one torque-transmitting mechanism 142 in certain operating conditions). Of course, it should be appreciated that in other embodiments, the device(s) 308 may be embodied as, or otherwise include, any device or collection of devices capable of providing other suitable input indicative of one or more operational characteristics of the transmission 120, 230, one or more operational characteristics of the vehicle associated with the transmission 120, 230, and/or one or more characteristics associated with the operating environment of the vehicle 200 associated with the transmission 120, 230.

In some embodiments, the torque-transmitting mechanism(s) 142 include one or more sensors 316 and one or more control devices 318, each of which is communicatively coupled to the controller 302. The sensor(s) 316 may include, or otherwise be embodied as, any electrical device or collection of electrical devices capable of providing input data indicative of an operational characteristic(s) of the mechanism(s) 142, such as measuring clutch pressure delivered to the mechanism(s) 142 during a shift from one operational mode of the transmission 120, 230 to another, for example. Additionally, in some embodiments, the sensor(s) 316 may include a proximity sensor, such as a capacitive proximity sensor, an inductive proximity sensor, a hall effect sensor, or the like. The control device(s) 318 may include, or otherwise be embodied as, any hydro-mechanical or electro-mechanical device or collection of such devices capable of controlling fluid pressure delivery to the mechanism(s) 142, such as one or more pressure control solenoids, trim systems, trim valves, on/off solenoids, shift valves, logic valves, or the like.

In some embodiments, the brake(s) 320 include one or more sensors 322 and one or more control devices 324, each of which is communicatively coupled to the controller 302. The sensor(s) 322 may include, or otherwise be embodied as, any electrical device or collection of electrical devices capable of providing input data indicative of an operational characteristic(s) of the brake(s) 320, such as measuring clutch pressure delivered to the brake(s) 320 during a shift from one operational mode of the transmission 120, 230 to another, for example. Additionally, in some embodiments, the sensor(s) 322 may include a proximity sensor, such as a capacitive proximity sensor, an inductive proximity sensor, a hall effect sensor, or the like. The control device(s) 324 may include, or otherwise be embodied as, any hydro-mechanical or electro-mechanical device or collection of such devices capable of controlling fluid pressure delivery to the brake(s) 320, such as one or more pressure control solenoids, trim systems, trim valves, on/off solenoids, shift valves, logic valves, or the like.

The dashboard 326 of the illustrative control system 300 includes a display 328 and a user interface 330. The display 328 is configured to output or display various indications, messages, and/or prompts to an operator, which may be generated by the control system 300. The user interface 330 is configured to provide various inputs to the control system 300 based on various actions, which may include actions performed by an operator.

Figure 4:
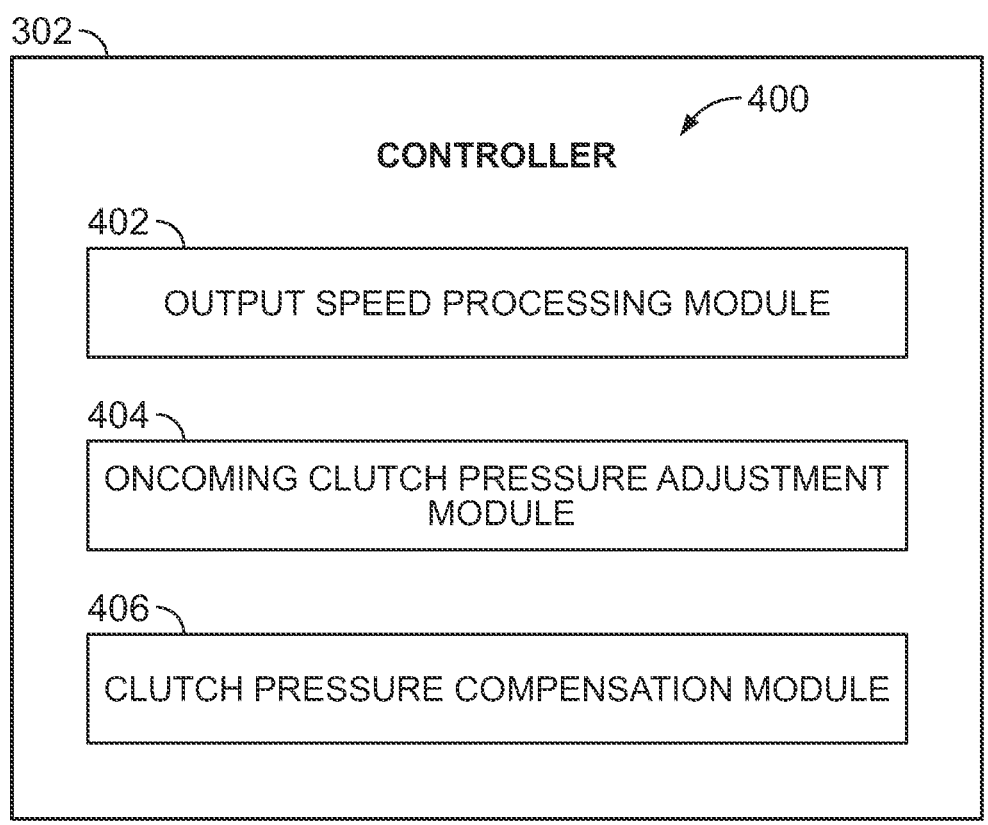
FIG. 4 is a diagrammatic view of a number of modules that may be included in a controller of the control system shown in FIG. 3.

Referring now to FIG. 4, in the illustrative embodiment, the controller 302 establishes an environment 400 during operation. The illustrative environment 400 includes an output speed processing module 402, an oncoming clutch pressure adjustment module 404, and a clutch pressure compensation module 406. Each of the modules, logic, and other components of the environment 400 may be embodied as hardware, firmware, software, or a combination thereof. As such, in some embodiments, one or more modules of the environment 400 may be embodied as circuitry or a collection of electrical devices. In such embodiments, one or more of the output speed processing module 402, the oncoming clutch pressure adjustment module 404, and the clutch pressure compensation module 406 may form a portion of the processor(s) 304 and/or other components of the controller 302. Additionally, in some embodiments, one or more of the illustrative modules may form a portion of another module and/or one or more of the illustrative modules may be independent of one another. Further, in some embodiments, one or more of the modules of the environment 400 may be embodied as virtualized hardware components or emulated architecture, which may be established and maintained by the processor(s) 304 or other components of the controller 302.

The output speed processing module 402, which may be embodied as hardware, firmware, software, virtualized hardware, emulated architecture, and/or a combination thereof as discussed above, is configured to monitor the speed of the output shaft 124 based on the input provided by the sensor 150. Additionally, in some embodiments, the output speed processing module 402 is configured to determine a difference between the monitored output speed and a reference output speed, such as a reference output speed stored in memory 306, for example. To do so, in the illustrative embodiment, the output speed processing module 402 may perform the method described below with reference to FIG. 7.

The oncoming clutch pressure adjustment module 404, which may be embodied as hardware, firmware, software, virtualized hardware, emulated architecture, and/or a combination thereof as discussed above, is configured to determine an adjustment to an oncoming clutch (e.g., one of the torque-transmitting mechanism(s) 142) pressure based on the determined difference between the monitored output speed and the reference output speed. To do so, in the illustrative embodiment, the oncoming clutch pressure adjustment module 404 may perform the method described below with reference to FIG. 8.

The clutch pressure compensation module 406, which may be embodied as hardware, firmware, software, virtualized hardware, emulated architecture, and/or a combination thereof as discussed above, is configured to determine a compensated clutch pressure or pressure command to be applied to the oncoming clutch (e.g., one of the torque-transmitting mechanism(s) 142) based on the determined adjustment to the oncoming clutch pressure. To do so, in the illustrative embodiment, the clutch pressure compensation module 406 may perform the method described below with reference to FIG. 9.

Figure 5:
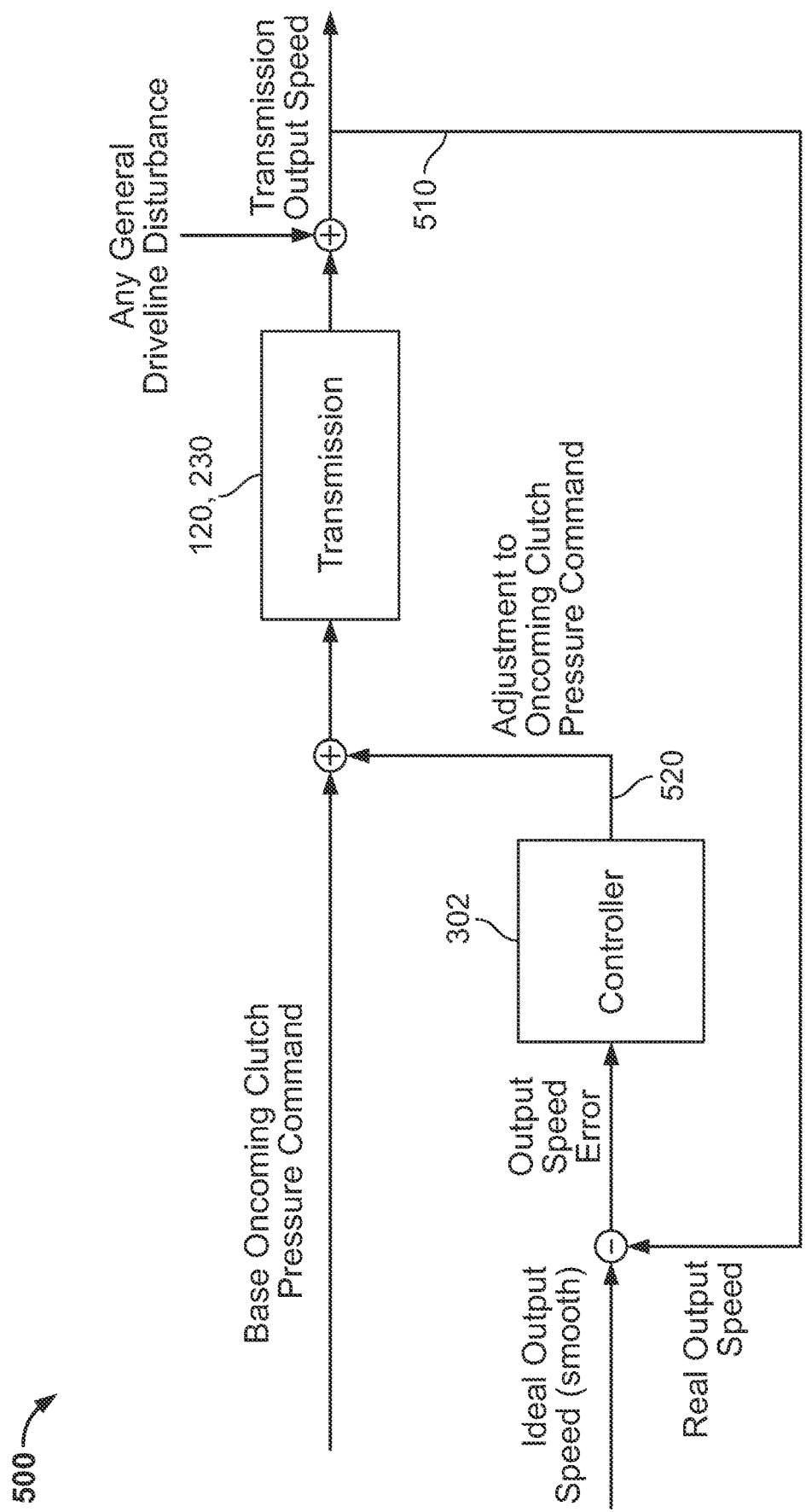
FIG. 5 is a schematic depiction of various inputs provided to, and functionalities performed by, the controller of the control system shown in FIG. 3 to dampen oscillations at a transmission output shaft.

Referring now to FIG. 5, a model 500 illustrates various inputs provided to, and features/functionalities performed by, the controller 302 to dampen oscillations at the output shaft 124 of the transmission 120, 230 in use of the vehicle 200. In some embodiments, the controller 302 (e.g., the output speed processing module 402, the oncoming clutch pressure adjustment module 404, and/or the clutch pressure compensation module 406) may execute or implement the model 500 in use of the transmission 120, 230. Additionally, in some embodiments, performance of the method 600 described below with reference to FIG. 6 by the controller 302 is effective to execute or implement the model 500 in use of the transmission 120, 230.

The model 500 illustratively includes a speed processing loop or section 510 and a control loop or section 520. In at least some embodiments, execution of the speed processing loop 510 by the controller 302 is initiated upon a first or initial detection (e.g., by the output speed sensor 150) of a rotational target disposed in proximity to the output shaft 124. In one example, the rotational target may be any single tooth of a plurality of teeth formed on, or located in close proximity to, the output shaft 124. In such embodiments, the first or initial detection of the tooth may prompt commencement, in a synchronous or substantially synchronous manner, of (i) speed sampling in the speed processing loop 510 and (ii) clutch pressure adjustment and control in the control loop 520. Thus, at least in some embodiments, the present disclosure envisions synchronous or substantially synchronous execution of the speed processing loop 510 and the control loop 520 by the controller 302, which may advantageously avoid time delays associated with periodic sampling in other configurations. Moreover, at least in some embodiments, synchronous or substantially synchronous execution of the speed processing loop 510 and the control loop 520 by the controller 302 in response to the initial detection of the rotational target offsets lag typically experienced during hydraulic actuation of the torque-transmitting mechanism(s) 142.

During execution of the illustrative speed processing loop 510, the controller 302 monitors the output speed of the transmission 120, 230 (i.e., based on the input signal provided by the output speed sensor 150) and compares the monitored or real output speed to a reference or ideal output speed that may be stored in the memory 306 of the controller 302. In the illustrative embodiment, output speed monitoring during execution of the speed processing loop 510 takes into account driveline disturbances (e.g., shudder) detectable at the output shaft 124. Based on the comparison, the controller 302 determines a difference or error between the monitored output speed and the reference output speed.

During execution of the illustrative control loop 520, the controller 302 calculates an adjustment to an oncoming clutch pressure based on the difference between the monitored output speed and the reference output speed determined during execution of the speed processing loop 510. Additionally, during execution of the illustrative control loop 520, the controller 302 determines, based on a base oncoming clutch pressure command (which may be stored in the memory 306 of the controller 302) and the calculated adjustment, a compensated clutch pressure to be applied to the torque-transmitting mechanism(s) 142 to dampen oscillations at the output shaft 124 in use of the transmission 120, 230.

Referring now to FIG. 6, an illustrative method 600 of dampening oscillations at the output shaft 124 of the transmission 120, 230 may include, or otherwise be embodied as, a set of instructions that are executable by the controller 302. The method 600 corresponds to, or is otherwise associated with, performance of the blocks described below in the illustrative sequence of FIG. 6. It should be appreciated, however, that the method 600 may be performed in one or more sequences different from the illustrative sequence.

The illustrative method 600 begins with block 602. In block 602, the controller 302 monitors the real or actual speed of the output shaft 124 based on the input provided by the output speed sensor 150. In some embodiments, monitoring is performed by the controller 302 in block 602 in response to the initial detection of the rotational target discussed above with reference to FIG. 5. Further, in some embodiments, monitoring is performed by the controller 302 in block 602 during execution of the speed processing loop 510 of the model 500. Further still, in some embodiments, monitoring is performed by the output speed processing module 402 in block 602 according at least partially to the method 700 described below with reference to FIG. 7. Regardless, from block 602, the method 600 proceeds to block 604.

In block 604 of the illustrative method 600, the controller 302 determines the difference between the monitored actual speed of the output shaft 124 and a reference output speed. In some embodiments, the reference output speed is stored in the memory 306 of the controller 302. Additionally, in some embodiments, the reference output speed is established based on a predetermined shift from one operational mode of the transmission 120, 230 to another operational mode during which the driveline is subjected to negligible or minimal disturbances. Further, in some embodiments, the controller 302 determines the difference in block 604 during execution of the speed processing loop 510 of the model 500. Further still, in some embodiments, the difference is determined by the output speed processing module 402 in block 604 according at least partially to the method 700 described below with reference to FIG. 7. Regardless, from block 604, the method 600 proceeds to block 606.

In block 606 of the illustrative method 600, the controller 302 determines the adjustment to the oncoming clutch pressure of the torque-transmitting mechanism(s) 142 based on the difference determined in block 604. In some embodiments, the controller 302 determines the adjustment in block 606 during execution of the control loop 520 of the model 500. Additionally, in some embodiments, the adjustment is determined by the oncoming clutch pressure adjustment module 404 in block 606 according at least partially to the method 800 described below with reference to FIG. 8. Regardless, from block 606, the method 600 proceeds to block 608.

In block 608 of the illustrative method 600, the controller 302 determines the compensated clutch pressure to be applied to the torque-transmitting mechanism(s) 142 based on the adjustment determined in block 606. In some embodiments, the controller 302 determines the compensated clutch pressure in block 608 during execution of the control loop 520 of the model 500. Additionally, in some embodiments, the compensated clutch pressure is determined by the clutch pressure compensation module 406 in block 608 according at least partially to the method 900 described below with reference to FIG. 9. Regardless, from block 608, the method 600 proceeds to block 610.

In block 610 of the illustrative method 600, the controller 302 applies the compensated clutch pressure determined in block 608 to the torque-transmitting mechanism(s) 142 to dampen oscillations at the output shaft 124. The present disclosure envisions application of the compensated clutch pressure to the torque-transmitting mechanism(s) 142 by the controller 302 in block 610 as a software-implemented alternative to a mechanical damper physically coupled to the output shaft 124. In some embodiments, the controller 302 applies the compensated clutch pressure in block 610 during execution of the control loop 520 of the model 500.

Figure 7:
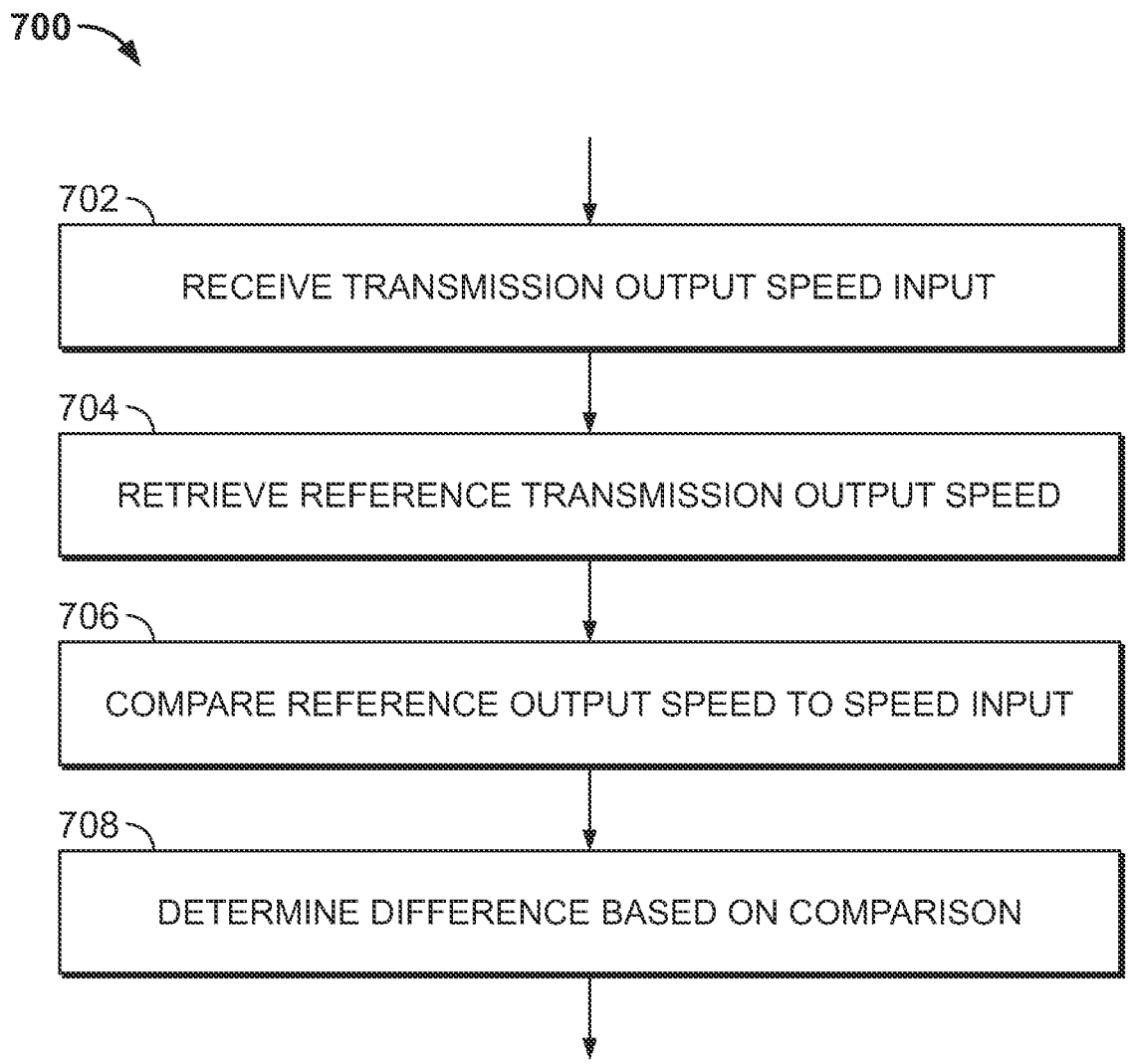
FIG. 7 is a simplified flowchart of a method that may be performed by an output speed processing module of the controller diagrammatically depicted in FIG. 4.

Referring now to FIG. 7, an illustrative method 700 of monitoring the actual speed of the output shaft 124 and determining the difference between the monitored output speed and the reference output speed may include, or otherwise be embodied as, a set of instructions that are executable by the controller 302 (e.g., the output speed processing module 402). The method 700 corresponds to, or is otherwise associated with, performance of the blocks described below in the illustrative sequence of FIG. 7. It should be appreciated, however, that the method 700 may be performed in one or more sequences different from the illustrative sequence.

The illustrative method 700 begins with block 702. In block 702, the controller 302 receives the input from the output speed sensor 150 indicative of the actual speed of the output shaft 124. From block 702, the method 700 proceeds to block 704.

In block 704 of the illustrative method 700, the controller 302 retrieves the reference output speed to be compared to the speed input received in block 702. In some embodiments, to perform block 704, the controller 302 retrieves the reference output speed from one or more lookup tables stored in memory 306. From block 704, the method 700 proceeds to block 706.

In block 706 of the illustrative method 700, the controller 302 compares the reference output speed retrieved in block 704 to the speed input received in block 702. From block 706, the method 700 proceeds to block 708.

In block 708 of the illustrative method 700, the controller 302 determines the difference between the reference output speed and the received speed input based on the comparison performed in block 706.

Figure 8:
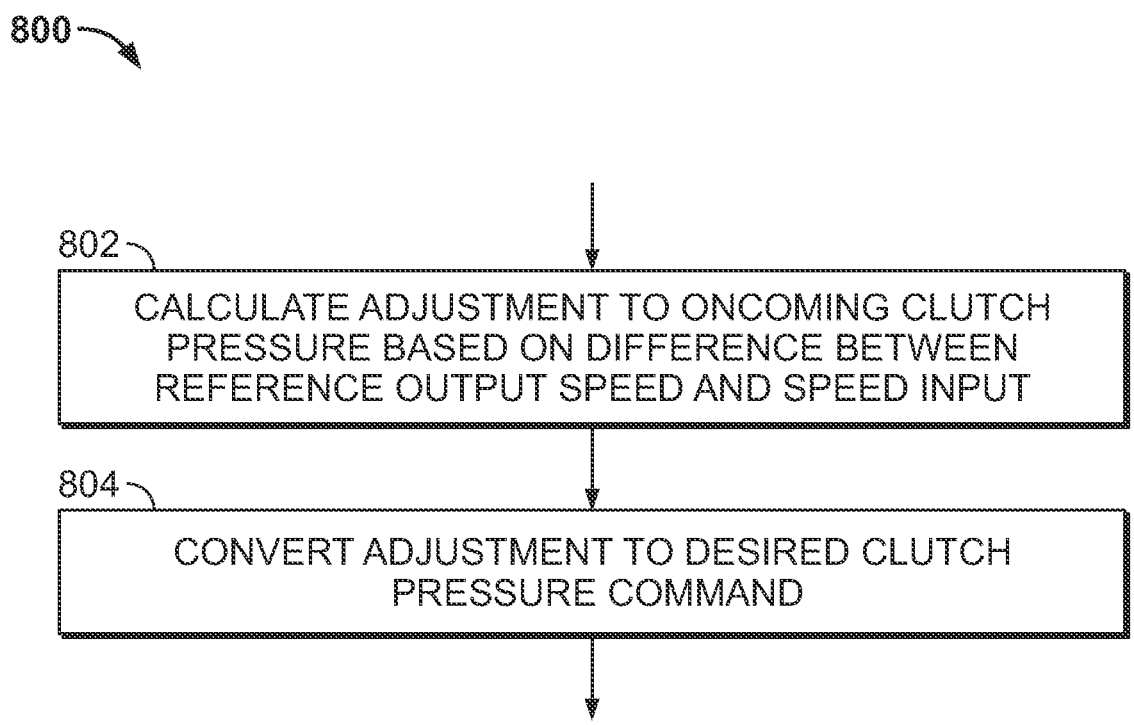
FIG. 8 is a simplified flowchart of a method that may be performed by an oncoming clutch pressure adjustment module of the controller diagrammatically depicted in FIG. 4.

Referring now to FIG. 8, an illustrative method 800 of determining the adjustment to the oncoming clutch pressure of the torque-transmitting mechanism(s) 142 based on the difference determined in block 708 may include, or otherwise be embodied as, a set of instructions that are executable by the controller 302 (e.g., the oncoming clutch pressure adjustment module 404). The method 800 corresponds to, or is otherwise associated with, performance of the blocks described below in the illustrative sequence of FIG. 8. It should be appreciated, however, that the method 800 may be performed in one or more sequences different from the illustrative sequence.

The illustrative method 800 begins with block 802. In block 802, the controller 302 calculates the adjustment to the oncoming clutch pressure of the torque-transmitting mechanism(s) 142 based on the difference determined in block 708 of the method 700. In some embodiments, the calculation performed in block 802 may be based on lookup or reference tables stored in the memory 306 of the controller 302. From block 802, the method 800 proceeds to block 804.

In block 804 of the illustrative method 800, the controller 302 converts the adjustment calculated in block 802 to a desired clutch pressure command. In some embodiments, the conversion performed in block 804 may be based on lookup or reference tables stored in the memory 306 of the controller 302.

Figure 9:
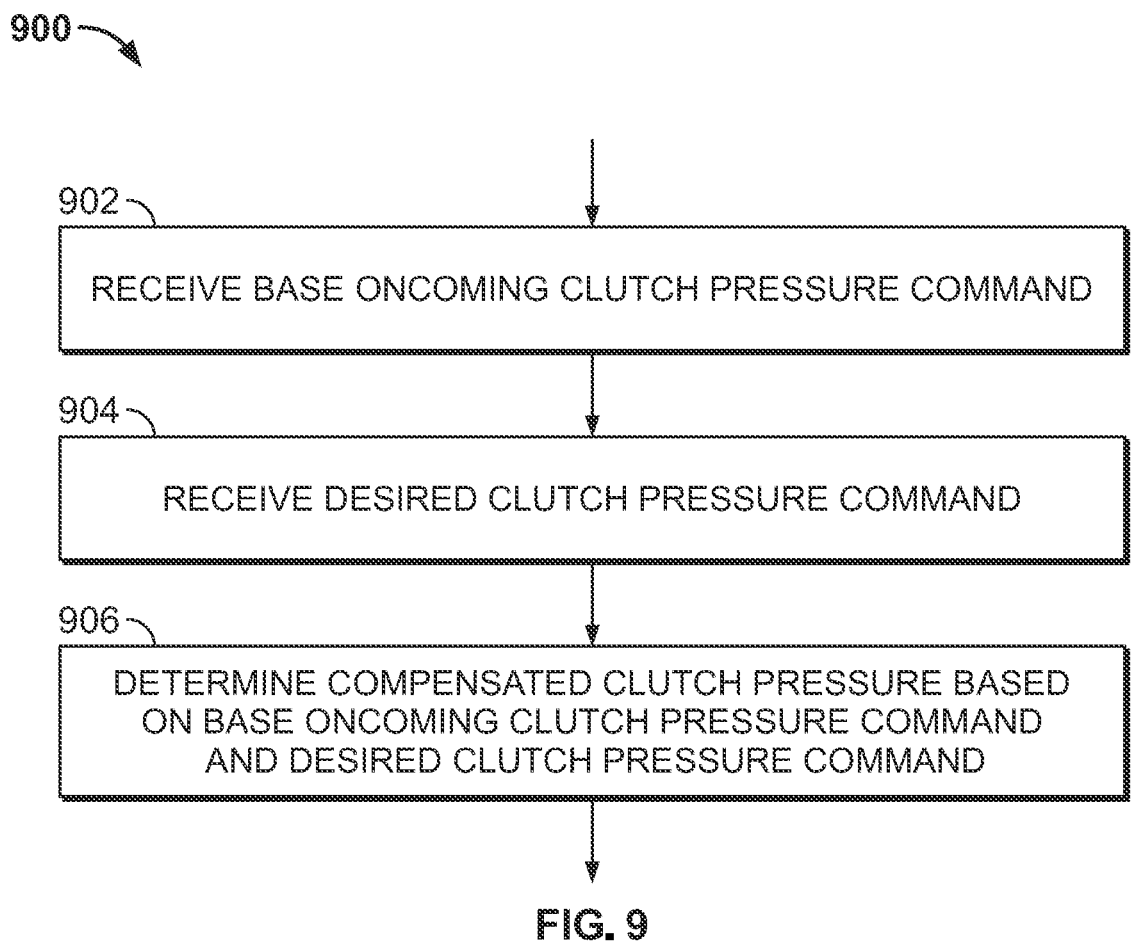
FIG. 9 is a simplified flowchart of a method that may be performed by a clutch pressure compensation module of the controller diagrammatically depicted in FIG. 4.

Referring now to FIG. 9, an illustrative method 900 of determining the compensated clutch pressure to be applied to the torque-transmitting mechanism(s) 142 may include, or otherwise be embodied as, a set of instructions that are executable by the controller 302 (e.g., the clutch pressure compensation module 406). The method 900 corresponds to, or is otherwise associated with, performance of the blocks described below in the illustrative sequence of FIG. 9. It should be appreciated, however, that the method 900 may be performed in one or more sequences different from the illustrative sequence.

The illustrative method 900 begins with block 902. In block 902, the controller 302 receives or retrieves a base oncoming clutch pressure command for the torque-transmitting mechanism(s) 142 that may be established with respect to a particular shift or transition from one operating mode of the transmission 120, 230 to another operating mode. In the illustrative embodiment, the base oncoming clutch pressure command does not account for driveline disturbances (e.g., shudder) experienced during operation of the transmission 120, 230. In some embodiments, the base oncoming clutch pressure command may be based on lookup or reference tables stored in the memory 306 of the controller 302. In any case, from block 902, the method 900 proceeds to block 904.

In block 904 of the illustrative method 900, the controller 302 receives or retrieves the desired clutch pressure command determined in block 804. In the illustrative embodiment, the desired clutch pressure command accounts for driveline disturbances (e.g., shudder) experienced during operation of the transmission 120, 230. From block 904, the method 900 proceeds to block 906.

In block 906 of the illustrative method 900, the controller 302 determines the compensated clutch pressure to be applied to the torque-transmitting mechanism(s) 142 based on the base oncoming clutch pressure command and the desired clutch pressure command. In some embodiments, in block 906, the controller 302 determines a compensated clutch pressure command that is representative of the compensated clutch pressure. Additionally, in some embodiments, based on the compensated clutch pressure command determined in block 906, the controller 302 applies the compensated clutch pressure to the torque-transmitting mechanism(s) 142 to account for driveline disturbances (e.g., shudder) experienced during operation of the transmission 120, 230.

Figure 10A:
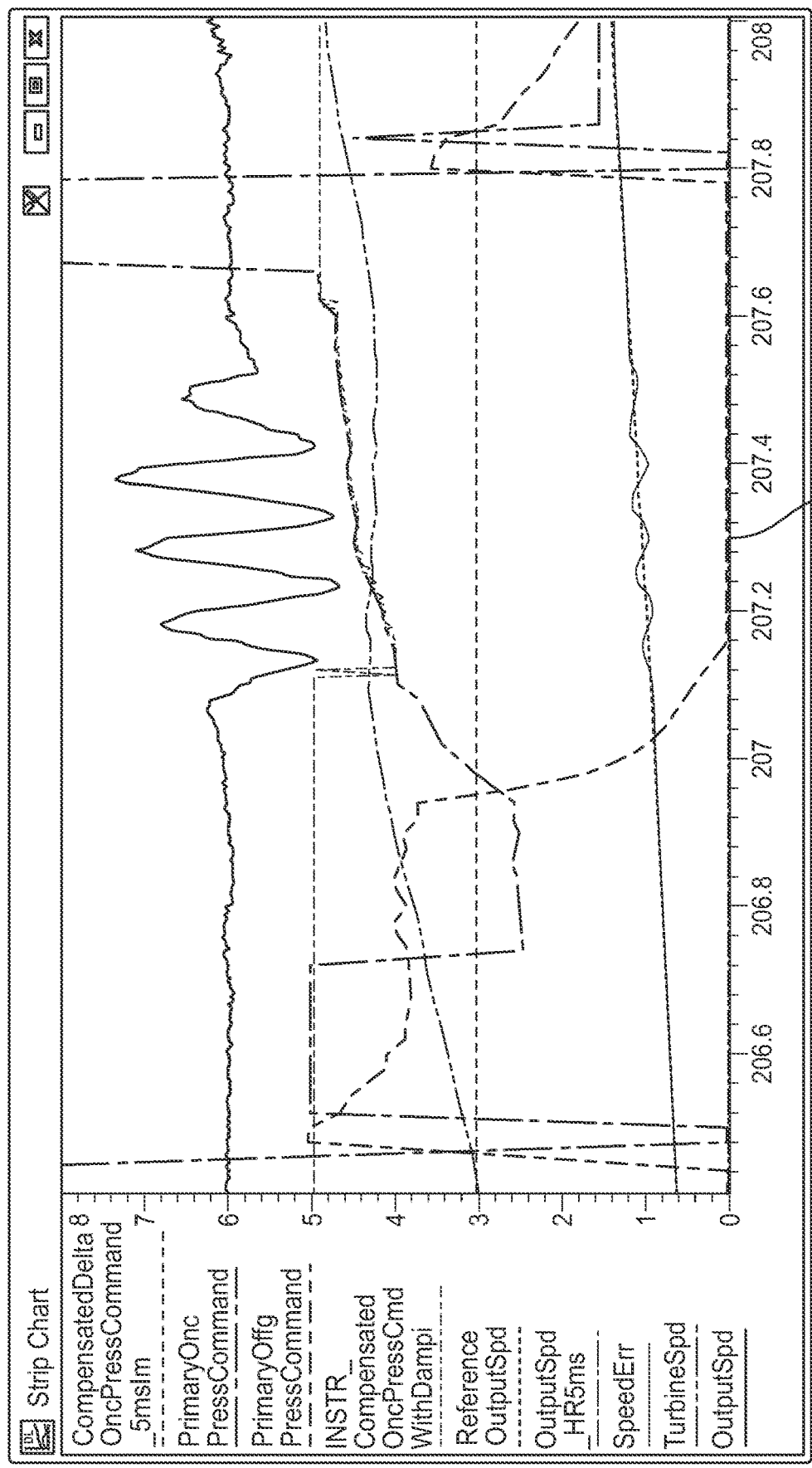
FIG. 10A is a graphical depiction of oscillations at a transmission output shaft without any dampening or shudder mitigation.
Figure 10B:
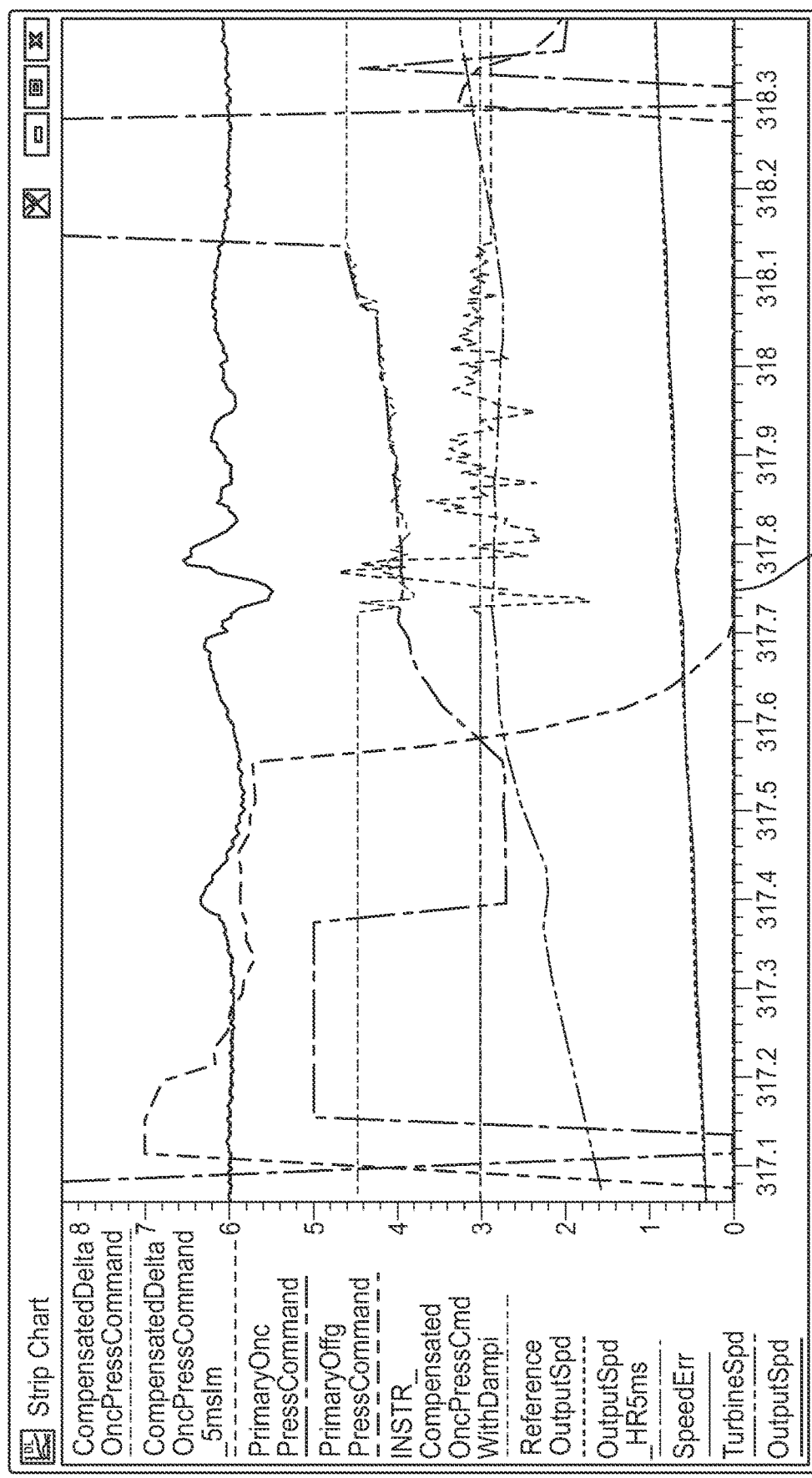
FIG. 10B is a graphical depiction of oscillations at a transmission output shaft with dampening/shudder mitigation.

Referring now to FIGS. 10A and 10B, in the illustrative embodiment, output shaft oscillations characterized as shudder are depicted in the region 1010 shown in FIG. 10A in the absence of any dampening (e.g., according to the method 600) performed by the controller 302. Such oscillations may have a frequency in the range of 5-20 Hz that varies depending on the particular shift during which shudder occurs and the particular vehicle configuration. In contrast, when dampening is performed by the controller 302, output shaft oscillations and shudder are generally not present in the region 1020 shown in FIG. 10B.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A vehicle comprising:
a chassis;
a plurality of wheels coupled to the chassis; and
a powertrain mounted to the chassis including a transmission comprising
an input shaft to receive torque from a drive unit,
an output shaft to transmit torque to a load,
at least one torque-transmitting mechanism coupled between the input shaft and the output shaft, and
a control system including an output speed sensor to provide an input signal indicative of a rotational speed of the output shaft and a controller communicatively coupled to the output speed sensor,
wherein:
the controller includes a processor and memory having instructions stored therein, and
the instructions are executable by the processor to cause the processor to monitor the rotational speed of the output shaft based on the input signal, to determine a difference between the monitored rotational speed and a reference rotational speed of the output shaft, to determine an adjustment to an oncoming clutch pressure to be applied to the at least one torque-transmitting mechanism based on the difference, to determine a compensated clutch pressure to be applied to the at least one torque-transmitting mechanism based on the adjustment, and to apply the compensated clutch pressure to the at least one torque-transmitting mechanism to dampen oscillations at the output shaft in use of the vehicle.

2. The vehicle of claim 1, wherein the vehicle is devoid of a mechanical damper coupled to the output shaft.

3. The vehicle of claim 2, wherein the instructions are executable by the processor to cause the processor to apply the compensated clutch pressure to the at least one torque-transmitting mechanism to dampen oscillations at the output shaft during a transition from one operating mode of the transmission to another operating mode of the transmission.

4. The vehicle of claim 1, wherein to determine the difference between the monitored rotational speed and the reference rotational speed of the output shaft, the instructions are executable by the processor to cause the processor to receive the input signal from the output speed sensor, to retrieve the reference rotational speed of the output shaft, to compare the input signal to the reference rotational speed, and to determine the difference based on the comparison.

5. The vehicle of claim 4, wherein to determine the adjustment to the oncoming clutch pressure, the instructions are executable by the processor to cause the processor to calculate the adjustment based on the difference between the monitored rotational speed and the reference rotational speed of the output shaft and to convert the calculated adjustment to a desired clutch pressure command.

6. The vehicle of claim 5, wherein to determine the compensated clutch pressure, the instructions are executable by the processor to cause the processor to receive a base oncoming clutch pressure command, to receive the desired clutch pressure command, and to determine the compensated clutch pressure based on the base oncoming clutch pressure command and the desired clutch pressure command.

7. The vehicle of claim 1, wherein to monitor the rotational speed of the output shaft, the instructions are executable by the processor to cause the processor to monitor the rotational speed of the output shaft in response to an initial detection by the output speed sensor of a rotational target disposed in proximity to the output shaft.

8. The vehicle of claim 7, wherein the rotational target is any one of a plurality of teeth formed on the output shaft.

9. The vehicle of claim 7, wherein initial detection by the output speed sensor of the rotational target offsets lag in hydraulic actuation of the at least one torque-transmitting mechanism.

10. A transmission comprising:
an input shaft to receive torque from a drive unit;
an output shaft to transmit torque to a load;
at least one torque-transmitting mechanism coupled between the input shaft and the output shaft; and
a control system including an output speed sensor to provide an input signal indicative of a rotational speed of the output shaft and a controller communicatively coupled to the output speed sensor,
wherein:
the controller includes a processor and memory having instructions stored therein,
the instructions are executable by the processor to cause the processor to monitor the rotational speed of the output shaft based on the input signal, to determine a difference between the monitored rotational speed and a reference rotational speed of the output shaft, and to determine an adjustment to an oncoming clutch pressure to be applied to the at least one torque-transmitting mechanism based on the difference, and
the transmission is devoid of a mechanical damper coupled to the output shaft.

11. The transmission of claim 10, wherein to determine the adjustment to the oncoming clutch pressure, the instructions are executable by the processor to cause the processor to calculate the adjustment based on the difference between the monitored rotational speed and the reference rotational speed of the output shaft and to convert the calculated adjustment to a desired clutch pressure command.

12. The transmission of claim 10, wherein to determine the difference between the monitored rotational speed and the reference rotational speed of the output shaft, the instructions are executable by the processor to cause the processor to receive the input signal from the output speed sensor, to retrieve the reference rotational speed of the output shaft, to compare the input signal to the reference rotational speed, and to determine the difference based on the comparison.

13. The transmission of claim 10, wherein to monitor the rotational speed of the output shaft, the instructions are executable by the processor to cause the processor to monitor the rotational speed of the output shaft in response to an initial detection by the output speed sensor of any one of a plurality of teeth disposed in proximity to the output shaft.

14. The transmission of claim 13, wherein initial detection by the output speed sensor of the any one of the plurality of teeth offsets lag in hydraulic actuation of the at least one torque-transmitting mechanism.

15. The transmission of claim 10, wherein the instructions are executable by the processor to cause the processor to determine a compensated clutch pressure to be applied to the at least one torque-transmitting mechanism based on the adjustment.

16. The transmission of claim 15, wherein the instructions are executable by the processor to cause the processor to apply the compensated clutch pressure to the at least one torque-transmitting mechanism to dampen oscillations at the output shaft in use of the transmission.

17. A method of dampening oscillations at an output shaft of a transmission, the method comprising:

monitoring, by a controller, a rotational speed of the output shaft based on an input signal provided by an output speed sensor;

determining, by the controller, a difference between the monitored rotational speed and a reference rotational speed of the output shaft;

determining, by the controller, an adjustment to an oncoming clutch pressure to be applied to at least one torque-transmitting mechanism of the transmission based on the difference;

determining, by the controller, a compensated clutch pressure to be applied to the at least one torque-transmitting mechanism based on the adjustment; and applying, by the controller, the compensated clutch pressure to the at least one torque-transmitting mechanism to dampen oscillations at the output shaft in use of the transmission.

18. The method of claim 17, wherein applying the compensated clutch pressure to the at least one torque-transmitting mechanism includes dampening oscillations at the output shaft without using a mechanical damper coupled to the output shaft.

19. The method of claim 17, wherein monitoring the rotational speed of the output shaft includes monitoring the rotational speed of the output shaft in response to an initial detection by the output speed sensor of any one of a plurality of teeth disposed in proximity to the output shaft.

20. The method of claim 19, wherein initial detection by the output speed sensor of the any one of the plurality of teeth offsets lag in hydraulic actuation of the at least one torque-transmitting mechanism.

* * * * *